No. 647,753. Patented Apr. 17, 1900.
R. MACRAE.
STORAGE BATTERY ELECTRODE.
(Application filed Nov. 17, 1899.)
(No Model.)
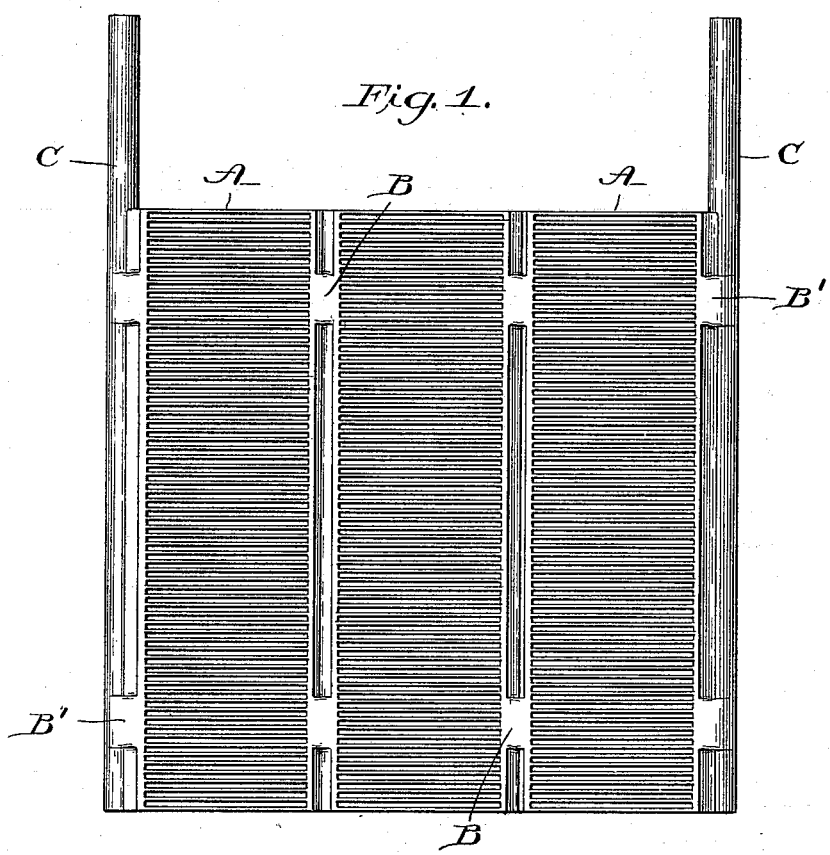
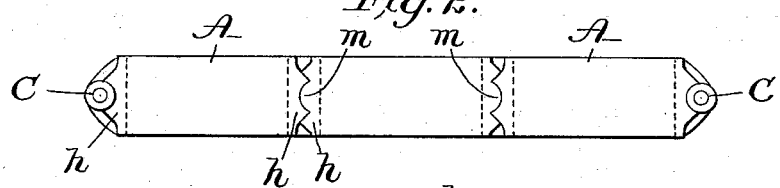
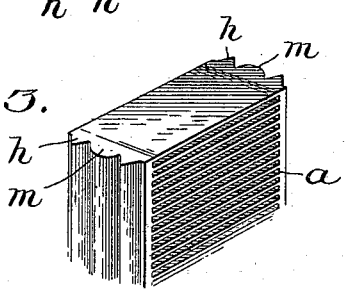
WITNESSES:
A. V. Groups
C. E. Parker
INVENTOR
Roderick Macrae
BY
ATTORNEY

UNITED STATES PATENT OFFICE.

RODERICK MACRAE, OF PHILADELPHIA, PENNSYLVANIA, ASSIGNOR OF ONE-HALF TO WILLIAM C. L. EGLIN, OF SAME PLACE.

STORAGE-BATTERY ELECTRODE.

SPECIFICATION forming part of Letters Patent No. 647,753, dated April 17, 1900.

Application filed November 17, 1899. Serial No. 737,277. (No model.)

*To all whom it may concern:*

Be it known that I, RODERICK MACRAE, a subject of the Queen of Great Britain, residing at Philadelphia, Pennsylvania, have invented certain new and useful Improvements in Storage-Battery Electrodes, of which the following is a full, clear, and exact description, reference being had to the accompanying drawings, forming a part of this specification.

My invention relates to electrodes for storage and other batteries; and it consists in the novel features of construction hereinafter described and claimed—viz., in the construction of the central elemental unit of the battery-plate and, second, in a specific combination therewith of two other unit-plates of the character described in pending application filed by me, Serial No. 714,280, whereby small battery-plates may be constructed with increased economy and facility.

In the accompanying drawings, illustrating my invention, Figure 1 is a front elevation of my improved battery-electrode. Fig. 2 is a plan view of the device of Fig. 1, and Fig. 3 is a perspective view of the central elemental unit entering into the assembled and combined battery-plate shown in Fig. 1.

That feature of the device which consists in forming an integral slatted structure by uniting at the edges of their opposite ends a series of spaced slats or flat lead strips and building up thereon a solid edge portion by means of a solder mass, so as to form an integral structure, I do not claim herein, as it forms the subject of a separate and now pending application, Serial No. 712,270.

The novel elemental unit in the present device is shown in Fig. 3, and it consists of the series of short lead strips or plates, which are first spaced from each other by interposed or integral flanges arranged transversely, these spaced plates $a$ being united at their end edges by a solder mass applied thereto, whereby an integral solid vertical edge piece is formed, as indicated at $h\ h$. In forming the elemental unit shown in Fig. 3, I proceed in the same way as far as thus stated; but having formed such solder edges $h\ h$ the structure is then run through an appropriate machine to form on each of its vertical solder edges a bead $m\ m$, as shown in Figs. 2 and 3.

In a pending application, Serial No. 714,280, I have shown and described a similar construction other than that the solid vertical edges $h\ h$ are formed with vertical open grooves, and in my present improvement in making up the short three-unit battery-plate I employ said battery unit as shown in application filed by me Serial No. 714,280 for the end units, (marked A A herein.) In said last-mentioned application the units forming the battery-plate are united to each other by embedding a conducting and connecting wire in the opposite coinciding semi-cylindrical grooves in said solid edge portions.

The chief value of the specific elemental unit herein described resides in the capability it furnishes of constructing a small three-unit battery-plate, in that by providing longitudinal beads on its vertical edge portions the said beads will enter the semicylindrical grooves of the end unit-plates A A and will be held thereto by solder portions $b\ b$, avoiding any necessity for the use of a central conducting and connecting wire, like the end wires $c\ c$, said beads $m\ m$ furnishing a keying device coacting with the open grooves in the plates A A. The said plates A A are provided on one of their edges, as before, with conducting and connecting wires C C, lying in the open grooves thereof and soldered thereto, as indicated at B'.

Having thus described my invention, what I claim as new, and desire to secure by Letters Patent, is—

1. A unit-plate for a battery-electrode, consisting of a centrally-slatted lead structure with continuous solid edge portions each of which is provided with a longitudinal bead or flange $m$; substantially as described.

2. A battery-plate composed of a central unit-plate consisting of a slatted structure having solid edge portions exteriorly beaded longitudinally, in combination with a pair of unit-plates consisting of like slatted structures with solid edge portions exteriorly grooved and adapted by their said grooves to register with the longitudinal beads on the edge portions of the central unit-plate; connecting and conducting wires C C entering one of the grooves of the end unit-plates; with means such as solder fastenings B to maintain the said parts in assembled position; substantially as described.

In testimony whereof I have hereunto affixed my signature this 1st day of November, A. D. 1899.

RODERICK MACRAE.

Witnesses:
WALTER C. PUSEY,
H. T. FENTON.